United States Patent
Tsai et al.

(10) Patent No.: US 9,568,666 B2
(45) Date of Patent: Feb. 14, 2017

(54) ILLUMINATION APPARATUS

(71) Applicant: Global Lighting Technologies Inc., Taoyuan (TW)

(72) Inventors: Chung-Lin Tsai, Taoyuan (TW); Jiun-Hau Ie, Taoyuan (TW); Jerry Wu, Taoyuan (TW)

(73) Assignee: Global Lighting Technologies Inc., Taoyuan (TW)

( * ) Notice: Subject to any disclaimer, the term of this patent is extended or adjusted under 35 U.S.C. 154(b) by 0 days.

(21) Appl. No.: 15/210,875

(22) Filed: Jul. 14, 2016

(65) Prior Publication Data

US 2016/0320550 A1 Nov. 3, 2016

Related U.S. Application Data

(63) Continuation-in-part of application No. 14/838,289, filed on Aug. 27, 2015, now Pat. No. 9,429,697, and a continuation-in-part of application No. 14/838,380, filed on Aug. 28, 2015, now Pat. No. 9,429,702, said application No. 14/838,289 is a continuation-in-part of application No. 14/606,031, filed on Jan. 27, 2015, now Pat. No. 9,322,971, said application No. 14/838,380 is a continuation-in-part of application No. 14/606,031, filed on Jan. 27, 2015, now Pat. No. 9,322,971, which is a continuation-in-part of application No. 13/911,102, filed on Jun. 6, 2013, now Pat. No. 9,004,737, which is a continuation-in-part of application No. 13/172,882, filed on Jun. 30, 2011, now Pat. No. 8,480,286, which is a continuation-in-part of application No. 12/464,104, filed on May 12, 2009, now Pat. No. 7,997,784.

(51) Int. Cl.
*F21V 8/00* (2006.01)

(52) U.S. Cl.
CPC ............ *G02B 6/0076* (2013.01); *G02B 6/0043* (2013.01); *G02B 6/0068* (2013.01); *G02B 6/0083* (2013.01); *G02B 6/0088* (2013.01)

(58) Field of Classification Search
CPC ... G02B 6/0076; G02B 6/0043; G02B 6/0068; G02B 6/0083; G02B 6/0088
See application file for complete search history.

(56) References Cited

U.S. PATENT DOCUMENTS

| | | | | |
|---|---|---|---|---|
| 9,004,737 B2* | 4/2015 | Tsai | .................... | G02B 6/0083 362/630 |
| 2006/0290685 A1* | 12/2006 | Nagakubo | ............ | G02B 6/0068 345/175 |
| 2009/0073347 A1* | 3/2009 | Takahashi | .............. | G02B 6/002 349/65 |

* cited by examiner

*Primary Examiner* — Mary Ellen Bowman
(74) *Attorney, Agent, or Firm* — Jianq Chyun IP Office

(57) ABSTRACT

An illumination apparatus includes a first light-guide plate, a second light-guide plate and a base. Each of the first and second light-guide plates and the second light-guide plate includes a light-emitting surface, a side surface connecting the corresponding light-emitting surface, a micro-structure pattern, a circuit layer integrated with the corresponding side surface, and a color light source disposed on the corresponding side surface and electrically connecting the corresponding circuit layer. The region where the light from the color light source of first light-guide plate orthogonally emitting from is different from the region of where the light from the color light source of second light-guide plate orthogonally emitting from. The base includes a cavity for accommodating the side surfaces of the first and second light-guide plates and electrically connecting the corresponding circuit layers.

15 Claims, 5 Drawing Sheets

ILLUMINATION APPARATUS

CROSS-REFERENCE TO RELATED APPLICATION

This application is a continuation-in-part application of and claims the priority benefits of U.S. prior application Ser. No. 14/838,289, filed on Aug. 27, 2015, now allowed, and U.S. prior application Ser. No. 14/838,380, filed on Aug. 28, 2015, now allowed. This prior application Ser. No. 14/838, 289 and application Ser. No. 14/838,380 are continuation-in-part applications of and claims the priority benefit of a prior application Ser. No. 14/606,031, filed on Jan. 27, 2015, now patented as U.S. Pat. No. 9,322,971. This prior application Ser. No. 14/606,031 is a continuation-in-part application of and claims the priority benefit of a prior application Ser. No. 13/911,102, filed on Jun. 6, 2013, now patented as U.S. Pat. No. 9,004,737, which is a continuation-in-part application of and claims the priority benefit of a prior application Ser. No. 13/172,882, filed on Jun. 30, 2011, now patented as U.S. Pat. No. 8,480,286, which is a continuation-in-part application of and claims the priority benefit of U.S. patent application Ser. No. 12/464,104, filed on May 12, 2009, now patented as U.S. Pat. No. 7,997,784. The entirety of each of the above-mentioned patent applications is hereby incorporated by reference herein and made a part of this specification.

BACKGROUND OF THE INVENTION

Field of the Invention

The present invention generally relates to an illumination apparatus. More particularly, the present invention relates to an illumination apparatus including multiple light guide plates.

Description of Related Art

Conventionally, the light source of the illuminations are fluorescent lamp tubes, cold cathode fluorescence lamps (CCFLs), and light emitting diodes (LEDs). When the fluorescent lamp tubes or the cold cathode fluorescence lamps are used as the illumination light source, the application products possess the disadvantages of large weight, short lifetime, and low space utilization due to the limitation of the lifetime and the dimension of the light source itself. Besides, since there is trace mercury vapor or solid state mercury within the lamp tube, when the lamps are thrown away or repaired, it is necessary to recycle the lamp tubes to prevent the environment from being polluted.

Accordingly, in the public place, the light emitting diodes are gradually used as the light sources in illumination apparatus, the exhibition lamps or bill lamps. The methods for emitting light beams of illumination apparatuses may be generally mono-color illumination. However, design flexibility of mono-color illumination is limited and is not enough for the illumination apparatuses for both illumination and decoration purposes.

SUMMARY OF THE INVENTION

Accordingly, the present invention is directed to an illumination apparatus which is capable of performing multi-color illumination and increases the design flexibility thereof.

The present invention provides an illumination apparatus including a first light guide plate, a second light guide plate and a base. The first light guide plate includes a first light-emitting surface, a first side surface connected to the first light-emitting surface, a first micro structure pattern, a first circuit layer integrated with the first side surface, and at least one first color light source disposed on the first side surface and electrically connected to the first circuit layer, wherein light emitted by the first color light source enters the first light guide plate and being induced by the first micro structure pattern to orthogonally emit from a first region of the first light-emitting surface. The second light guide plate includes a second light-emitting surface, a second side surface connected to the second light-emitting surface, a second micro structure pattern and a second circuit layer integrated with the second side surface, and at least one second color light source disposed on the second side surface and electrically connected to the second circuit layer, wherein light emitted by the second color light source enters the second light guide plate and being induced by the second micro structure pattern to orthogonally emit from a second region of the second light-emitting surface. A projection area where the second region orthogonally projected onto the first light-emitting surface is not overlapped with the first region. The base includes a cavity for at least accommodating the first side surface of the first light guide plate and the second side surface of the second light guide plate, and electrically connected to the first circuit layer and the second circuit layer.

According to an embodiment of the present invention, the first micro structure pattern comprises a plurality of first micro concaves or a plurality of first micro bumps, and the second micro structure pattern comprise a plurality of second micro concaves or a plurality of second micro bumps.

According to an embodiment of the present invention, the first light guide plate and the second light guide plate are disposed on the base in a side-by-side manner.

According to an embodiment of the present invention, when the first light guide plate and the second light guide plate are disposed on the base, the second light guide plate facing the first light guide plate with the second light-emitting surface.

According to an embodiment of the present invention, the illumination apparatus further includes an optical clear adhesive (OCA) disposed between the first light guide plate and the second light guide plate.

According to an embodiment of the present invention, the base further comprises a plurality of electrodes located in the cavity and electrically connected to the first circuit layer and the second circuit layer.

According to an embodiment of the present invention, each of the electrodes protrudes from a bottom surface of the cavity.

According to an embodiment of the present invention, the electrodes are configured to be engaged with at least one the first side surface and the second side surface and electrically connected to both of the first color light source and the second color light source via the first circuit layer and the second circuit layer.

According to an embodiment of the present invention, the electrodes comprise a first electrode and a second electrode, and a cross-sectional shape of the first electrode is different from a cross-sectional shape of the second electrode.

According to an embodiment of the present invention, at least one of the first side surface and the second side surface comprises a first recess configured to be engaged with the first electrode, at least one of the first side surface and the second side surface comprises a second recess configured to be engaged with the second electrode.

According to an embodiment of the present invention, the first circuit layer and the second circuit layer are extended to the first recesses to be electrically connected to the first electrode, and extended to the second recess to be electrically connected to the second electrode.

According to an embodiment of the present invention, the first light guide plate further comprises at least one first recessed compartment disposed on the first side surface for receiving the at least one first color light source, the second light guide plate further comprises at least one second recessed compartment disposed on the second side surface for receiving the at least one second color light source.

According to an embodiment of the present invention, the illumination apparatus further includes an opaque film covers a part of the first light-emitting surface or a part of the second light-emitting surface.

According to an embodiment of the present invention, the first region corresponds to the first micro structure pattern, and the second region corresponds to the second micro structure pattern.

According to an embodiment of the present invention, the illumination apparatus further includes a third light guide plate having a third light-emitting surface, a third side surface connected to the third light-emitting surface, a third micro structure pattern and a third circuit layer integrated with the third side surface, and at least one third color light source disposed on the third side surface and electrically connected to the third circuit layer, wherein light emitted by the third color light source enters the third light guide plate and being induced by the third micro structure pattern to orthogonally emit from a third region of the third light-emitting surface, and a projection area where the third region orthogonally projected onto the first light-emitting surface is neither overlapped with the first region nor overlapped with the second region.

In light of the foregoing, the illumination apparatus of the invention includes multiple light guide plates, and each of the light guide plates includes a micro structure pattern for inducing light to orthogonally emit from a corresponding region of the light emitting surface thereof. As such, lights from different color light sources can respectively emit from different regions of the illumination apparatus, so as to improve the design flexibility of the illumination apparatus. Moreover, the color light sources are embedded in the light guide plates, so the user may also choose the preferable light guide plates according to the colors of lights emitted from the color light sources. Therefore, the illumination apparatus of the invention is capable of emitting lights from different regions of the light emitting surface and improving the design flexibility thereof.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
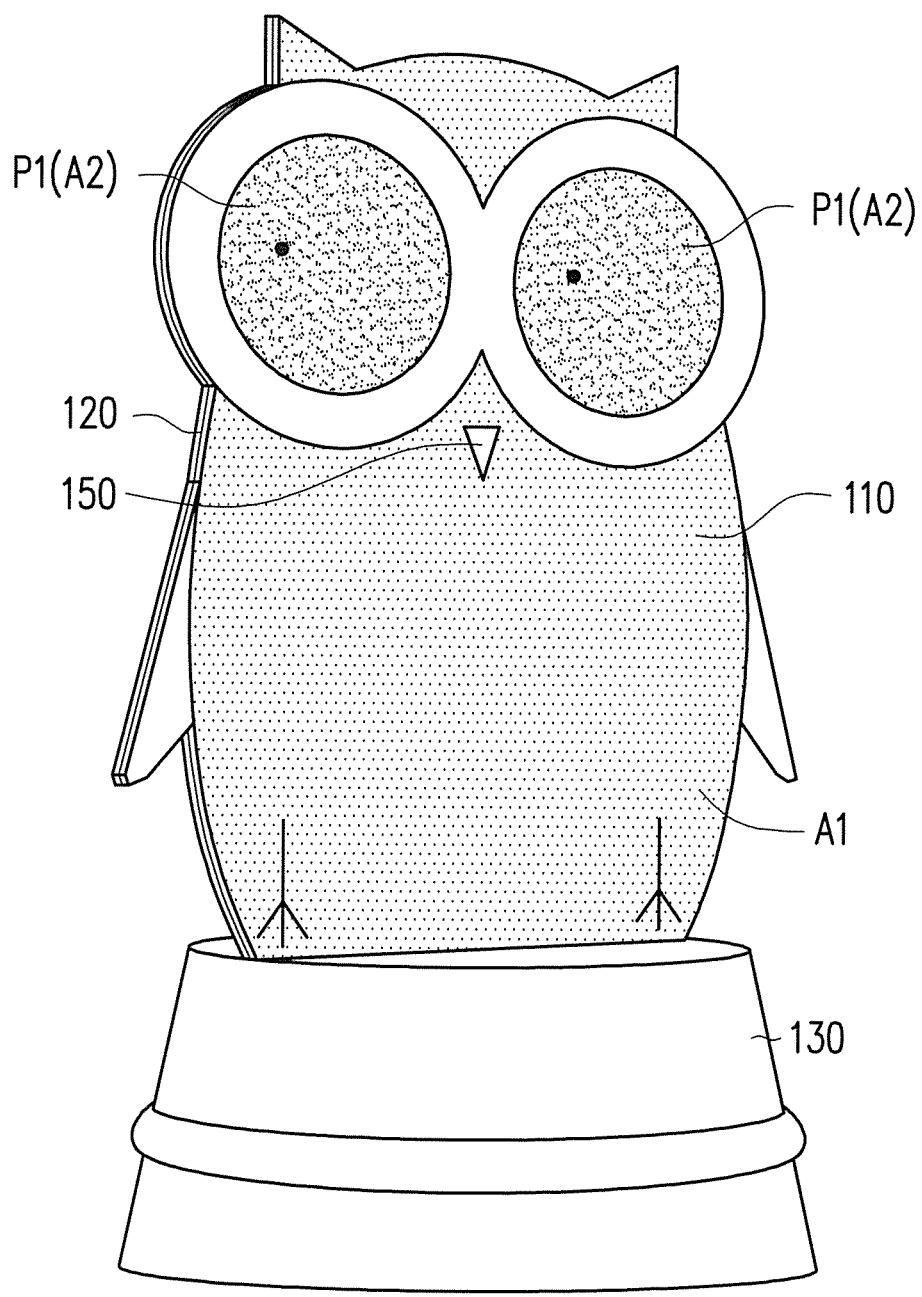
FIG. 1 illustrates a schematic view of an illumination apparatus according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
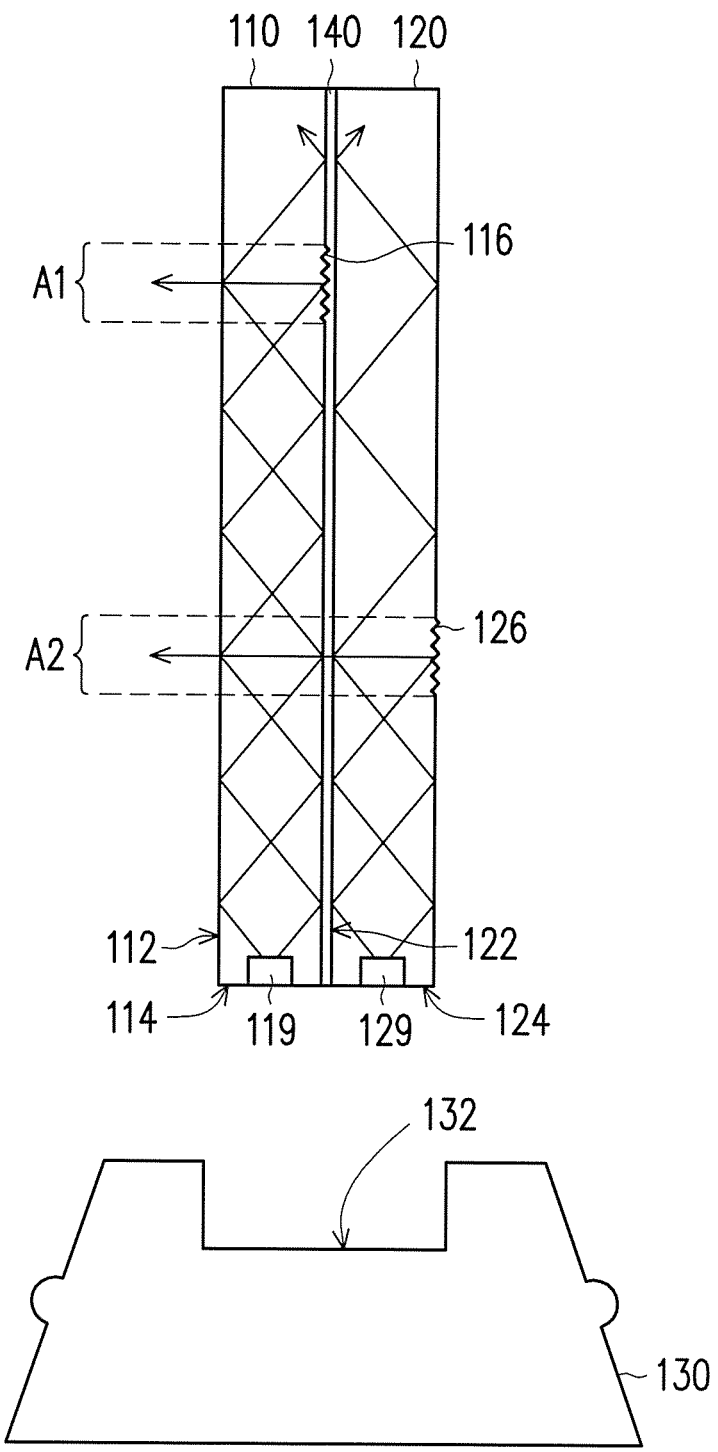
FIG. 2 illustrates an exploded and cross-sectional view of an illumination apparatus according to an embodiment of the invention.
Figure 3:
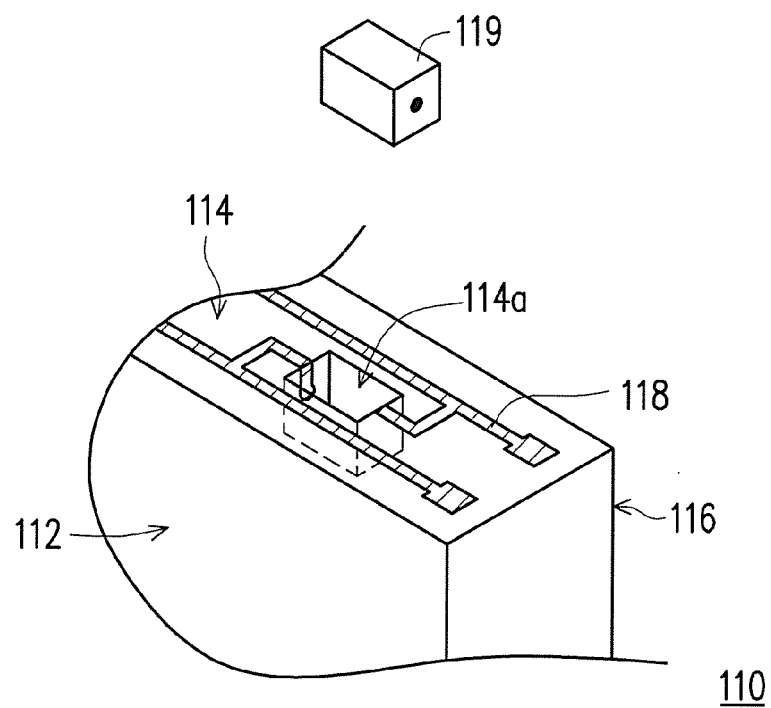
FIG. 3 illustrates an exploded view of a first light guide plate according to an embodiment of the invention.

FIG. 1 illustrates a schematic view of an illumination apparatus according to an embodiment of the invention. FIG. 2 illustrates an exploded and cross-sectional view of an illumination apparatus according to an embodiment of the invention. FIG. 3 illustrates an exploded view of a first light guide plate according to an embodiment of the invention. Referring to FIG. 1 to FIG. 3, in the present embodiment, an illumination apparatus 100 includes a first light guide plate 110, a second light guide plate 120 and a base 130. The first light guide plate 110 includes a first light-emitting surface 112, a first side surface 114, a first micro structure pattern 116, a first circuit layer 118 and at least one first color light source 119. The first side surface 114 is connected to the first light-emitting surface 112, and the first circuit layer 118 is integrated with the first side surface 114. As such, the first color light source 119 is disposed on the first side surface 114 and electrically connected to the first circuit layer 118.

In detail, the first light guide plate 110 may further include at least one first recessed compartment 114a disposed on the first side surface 114 for receiving the first color light source 119. Similarly, the second light guide plate 120 may further include at least one second recessed compartment disposed on the second side surface 124 for receiving the second color light source 129. As such, the first color light source 119 and the second color light source 129 are embedded in the first light guide plate 110 and the second light guide plate 120 respectively. It is noted that the present invention does not limit the number of the first color light source 119, the second color light source 129 and the corresponding recessed compartments.

In the present embodiment, the first micro structure pattern 116 includes a plurality of first micro concaves or a plurality of first micro bumps, and the first micro structure pattern 116 may be located at the first light-emitting surface 112 or a surface opposite to the first light-emitting surface 112, so as to serve to destroy the phenomenon of the total reflection, such that light emitted by the first color light source 119 would orthogonally emit from the first light guide plate 110 through the first light-emitting surface 112. To be more specific, light emitted by the first color light source 119 enters the first light guide plate 110 and is induced by the first micro structure pattern 116 to orthogonally emit from a first region A1 of the first light-emitting surface 112. Namely, the first region A1 where light orthogonally emits from is corresponding to the first micro structure pattern 116.

Similarly, the second light guide plate 120 includes a second light-emitting surface 122, a second side surface 124, a second micro structure pattern 126 and a second circuit layer 128 and at least one second color light source 129. The second side surface 124 is connected to the second light-emitting surface 122, and the second circuit layer 128 is integrated with the second side surface 124. As such, the at least one second color light source 129 is disposed on the second side surface 124 and electrically connected to the second circuit layer 128.

In the present embodiment, the second micro structure pattern 126 includes a plurality of second micro concaves or a plurality of second micro bumps, and the second micro structure pattern 126 may be located at the second light-emitting surface 122 or a surface opposite to the second light-emitting surface 122, so as to serve to destroy the phenomenon of the total reflection, such that light emitted by the second color light source 129 would orthogonally emit from the second light guide plate 120 through the second light-emitting surface 122. To be more specific, light emitted by the second color light source 129 enters the second light guide plate 120 and is induced by the second micro structure pattern 126 to orthogonally emit from a second region A2 of the second light-emitting surface 122. Namely, the second region A2 where light orthogonally emits from is corresponding to the second micro structure pattern 126.

Accordingly, a projection area P1 where the second region A2 orthogonally projected onto the first light-emitting surface 112 is not overlapped with the first region A1 as shown in FIG. 2. As such, light from the color light sources 119, 129 can respectively emit from two different regions A1, A2 of the illumination apparatus 100. In the present embodiment, the color of the light emits from the first color light source 119 is different from the color of the light emits from the second color light source 129, such that the illumination apparatus 100 is capable of emitting two different colors of lights from two different regions thereof, so as to improve the design flexibility of the illumination apparatus 100. In addition, the illumination apparatus 100 may further include an opaque film 150 covers a part of the first light-emitting surface 112 or a part of the second light-emitting surface 122 as shown in FIG. 1 for decoration purpose. For example, the color of the opaque film 150 may be yellow and the opaque film 150 is attached to the beak of the owl-shaped first light guide plate 110 to further enhance the design flexibility of the illumination apparatus 100.

Furthermore, the base 130 includes a cavity 132 for at least accommodating the first side surface 114 of the first light guide plate 110 and the second side surface 124 of the second light guide plate 120 as shown in FIG. 2, and the base 130 is electrically connected to the first circuit layer 118 and the second circuit layer 128. Accordingly, when the first light guide plate 110 and the second light guide plate 120 are accommodated in the bass 130, the first color light source 119 and the second color light source 129 are electrically connected to the base 130 through the first circuit layer 118 and the second circuit layer 128 to lighten up the first color light source 119 and the second color light source 129.

In the present embodiment, the first light guide plate 110 and the second light guide plate 120 are disposed on the base 130 in a side-by-side manner. To be more specific, when the first light guide plate 110 and the second light guide plate 120 are disposed on the base 130, the second light guide plate 120 faces the first light guide plate 110 with the second light-emitting surface 122, so the light emitted from the second light-emitting surface 122 can penetrate through the first light guide plate 110 and emit from the first light-emitting surface 112. In detail, the illumination apparatus 100 may further include an optical clear adhesive (OCA) 140 disposed between the first light guide plate 110 and the second light guide plate 120, so the first light guide plate 110 and the second light guide plate 120 can be adhered to each other as a set, and the set of the light guide plates 110, 120 can be accommodated in the base 130 together.

With such configuration, the illumination apparatus 100 can come with multiple sets of the light guide plates in variety of shapes, for example, the shapes of owl, frog, flower, etc., so a user may choose the preferable set of the light guide plates to dispose in the base 130 according to the shapes of the light guide plates. Also, each set of the light guide plates may include different color light sources for emitting different colors of lights, so the user may also choose the preferable set of the light guide plates according to the colors of lights emitted therefrom.

Figure 4:
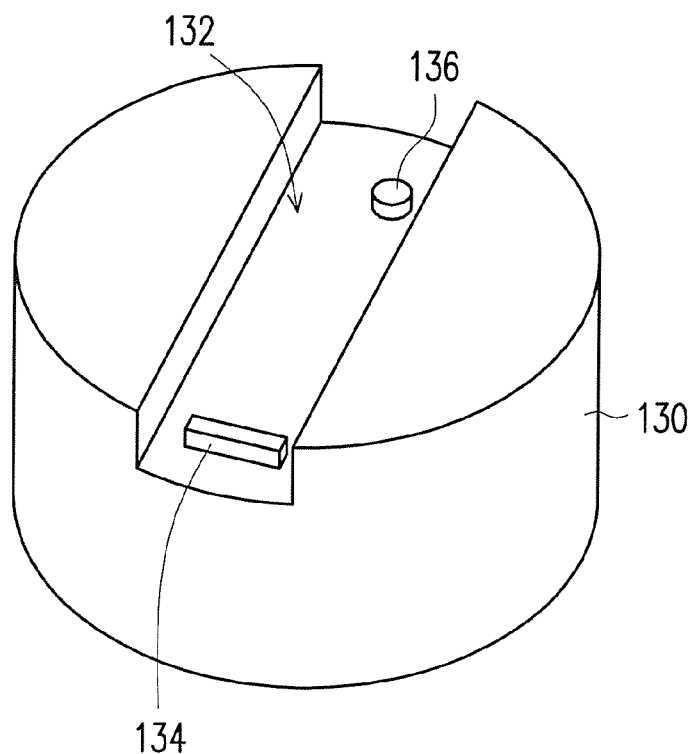
FIG. 4 illustrates a schematic view of a base according to an embodiment of the invention.
Figure 5:
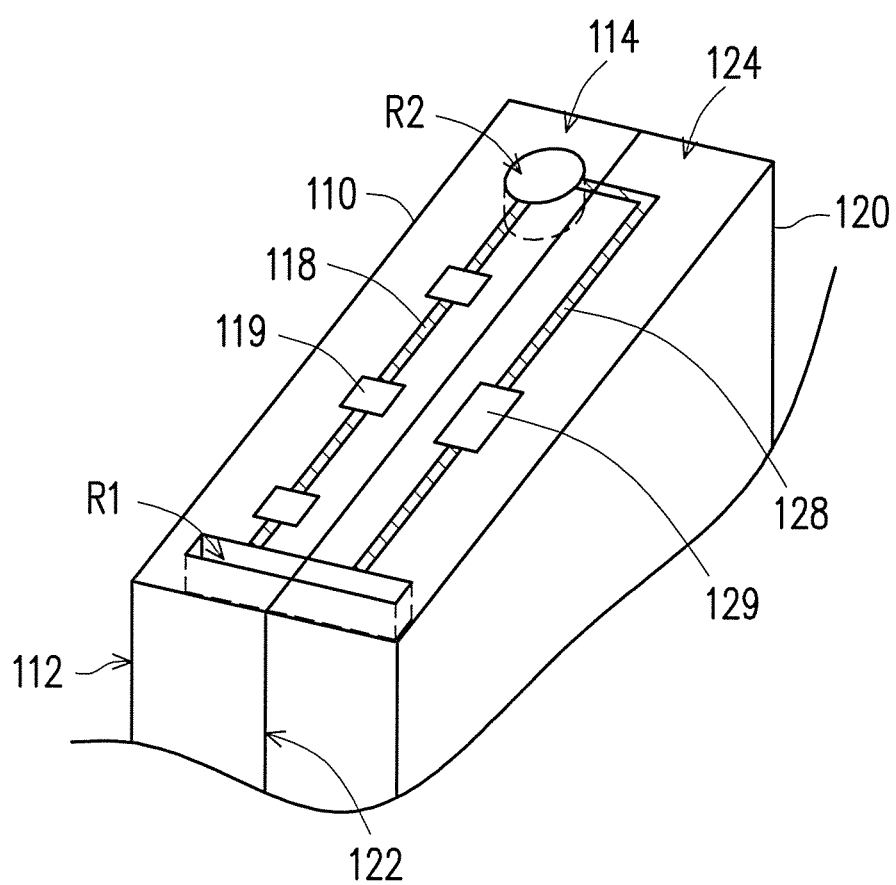
FIG. 5 illustrates a schematic view of a first light guide plate and a second light guide plate according to an embodiment of the invention.

FIG. 4 illustrates a schematic view of a base according to an embodiment of the invention. FIG. 5 illustrates a schematic view of a first light guide plate and a second light guide plate according to an embodiment of the invention. Referring to FIG. 4 and FIG. 5, the base 130 further includes a plurality of electrodes 134, 136 located in the cavity 132 and electrically connected to the first circuit layer 118 and the second circuit layer 128. To be more specific, the electrodes includes a first electrode 134 and a second electrode 136, and a cross-sectional shape of the first electrode 134 is different from a cross-sectional shape of the second electrode 136, so as to prevent the user from connecting the electrical contacts of the circuit layers 118, 128 with the wrong electrodes 134, 136.

In the present embodiment, the base 130 is electrically connected to an external power source, and the electrodes 134, 136 are configured to be engaged with the at least one of the first side surface 114 and the second side surface 124 and electrically connected to both of the first color light source 119 and the second color light source 129 via the first circuit layer 118 and the second circuit layer 128. To be more specific, each of the first electrodes 134 and the second electrode 136 may protrude from a bottom surface of the cavity 132 as shown in FIG. 4. Accordingly, at least one of the first side surface 114 and the second side surface 124 may include a first recess R1 configured to be engaged with the first electrode 134, and at least one of the first side surface 114 and the second side surface 124 may include a second recess R2 configured to be engaged with the second electrode 136 as shown in FIG. 5.

Accordingly, the first circuit layer 118 and the second circuit layer 128 are extended to the first recesses R1 to be electrically connected to the first electrode 134, and extended to the second recess R2 to be electrically connected to the second electrode 136. Thereby, when the first light guide plate 110 and the second light guide plate 120 are disposed on the base 130, the protruded electrodes 134, 136 of the base 130 are engaged with the recesses R1, R2 located on the first side surface 114 and the second side surface 124, so as to be electrically connected to the first color light source 119 and the second color light source 129 via the first circuit layer 118 and the second circuit layer 128.

Figure 6:
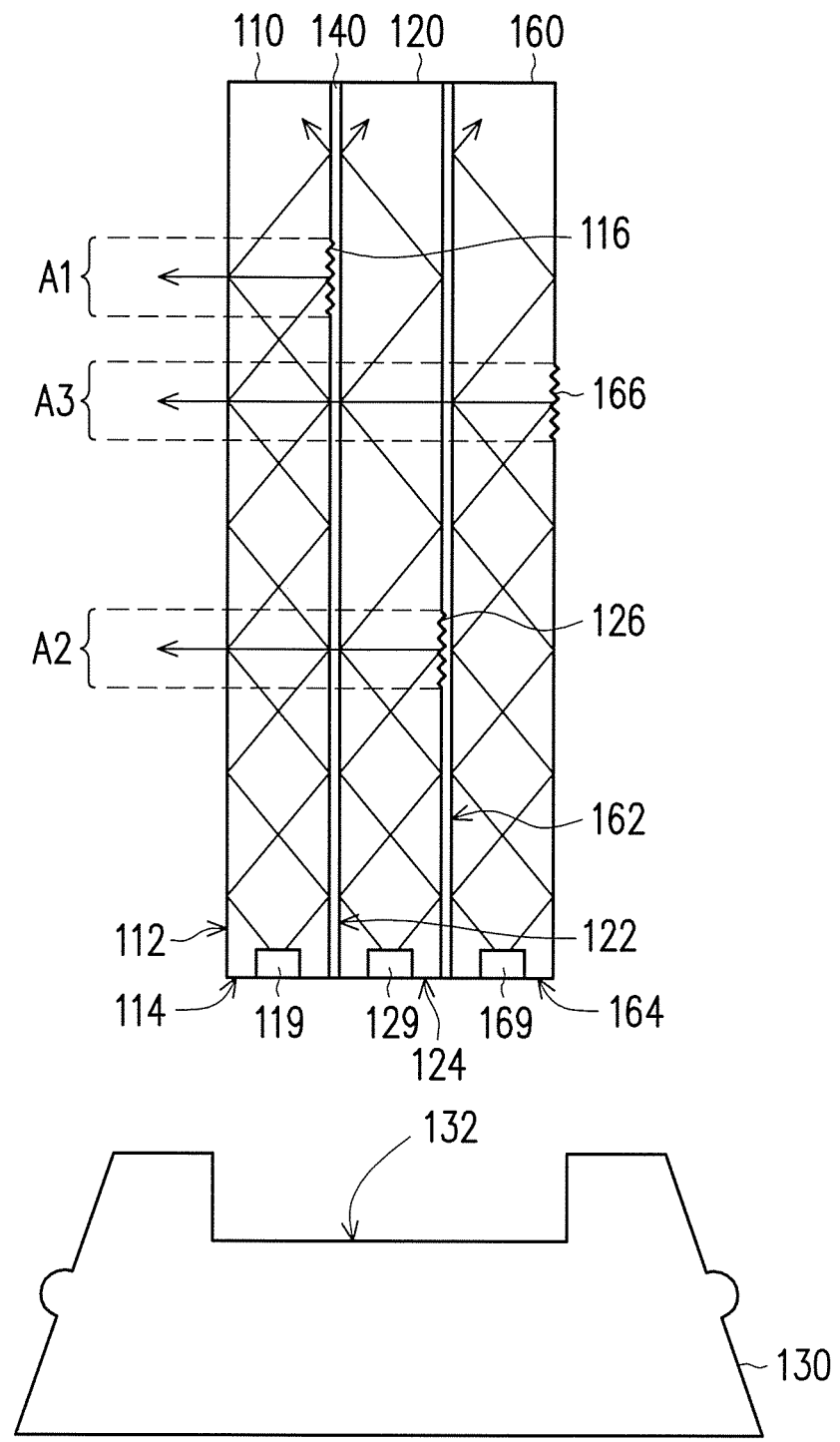
FIG. 6 illustrates an exploded and cross-sectional view of an illumination apparatus according to another embodiment of the invention.

FIG. 6 illustrates an exploded and cross-sectional view of an illumination apparatus according to another embodiment of the invention. It is noted that the illumination apparatus shown in FIG. 6 contains many features same as or similar to the illumination apparatus 100 disclosed earlier with FIG. 1 and FIG. 2. For purpose of clarity and simplicity, detail description of same or similar features may be omitted, and the same or similar reference numbers denote the same or like components. The main differences between illumination apparatus shown in FIG. 6 and the illumination apparatus 100 are described as follows.

In the present embodiment, the illumination apparatus may further include a third light guide plate 160. The third light guide plate 160 has a third light-emitting surface 162, a third side surface 164, a third micro structure pattern 166 and a third circuit layer and at least one third color light source 169. The third side surface 164 is connected to the third light-emitting surface 162. The third circuit layer is integrated with the third side surface 164, so the third color light source 169 disposed on the third side surface 164 can be electrically connected to the third circuit layer.

In the present embodiment, the light emitted by the third color light source 169 enters the third light guide plate 160 and is induced by the third micro structure pattern 166 to orthogonally emit from a third region A3 of the third light-emitting surface 162. In the present embodiment, the structure of the third light guide plate 160 is similar to the structures of the first light guide plate 110 and the second light guide plate 120 except for the location of the third micro structure pattern 166 is different from the locations of the first micro structure pattern 116 and the second micro structure pattern 126. To be more specific, a projection area where the third region A3 orthogonally projected onto the first light-emitting surface 112 is neither overlapped with the first region A1 nor overlapped with the second region A2 as shown in FIG. 6.

As such, light from the color light sources 119, 129, 169 can respectively emit from three different regions A1, A2 and A3 of the illumination apparatus. In the present embodiment, the color of the light emits from the third color light source 169 is different from the colors of the lights emit from the first color light source 119 and the second color light source 129, such that the illumination apparatus of the present embodiment is capable of emitting different colors of lights from three different regions A1, A2 and A3 thereof, so as to improve the design flexibility of the illumination apparatus. Furthermore, the optical clear adhesive (OCA) may also be disposed between the second light guide plate 120 and the third light guide plate 160, so the light guide plates 110, 120 and 160 can be adhered to each other as a set, and the set of the light guide plates 110, 120 and 160 can be accommodated in the base 130 together. Certainly, the present embodiment does not limit the number of the light guide plates to be accommodated in the base 130.

In summary, the illumination apparatus of the invention includes multiple light guide plates, and each of the light guide plates includes a micro structure pattern for inducing light to orthogonally emit from a corresponding region of the light emitting surface thereof. The lights emitted by the color light sources of different light-guide plates are orthogonally emitted from different regions of the light emitting surface of the illumination apparatus. Namely, lights from different color light sources can respectively emit from different regions of the illumination apparatus, so as to improve the design flexibility of the illumination apparatus. Moreover, the color light sources are embedded in the light guide plates, and the illumination apparatus can come with multiple sets of the light guide plates in variety of shapes with different color light sources, so the user may also choose the preferable set of the light guide plates according to the shapes of the light guide plates and the colors of lights emitted from the color light sources. Therefore, the illumination apparatus of the invention is capable of emitting lights from different regions of the light emitting surface and improving the design flexibility thereof.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An illumination apparatus, comprising:
a first light guide plate comprising a first light-emitting surface, a first side surface connected to the first light-emitting surface, a first micro structure pattern, a first circuit layer integrated with the first side surface, and at least one first color light source disposed on the first side surface and electrically connected to the first circuit layer, wherein light emitted by the first color light source enters the first light guide plate and is induced by the first micro structure pattern to orthogonally emit from a first region of the first light-emitting surface;
a second light guide plate comprising a second light-emitting surface, a second side surface connected to the second light-emitting surface, a second micro structure pattern and a second circuit layer integrated with the second side surface, and at least one second color light source disposed on the second side surface and electrically connected to the second circuit layer, wherein light emitted by the second color light source enters the second light guide plate and is induced by the second micro structure pattern to orthogonally emit from a second region of the second light-emitting surface, and a projection area where the second region orthogonally projected onto the first light-emitting surface is not overlapped with the first region; and
a base comprising a cavity for at least accommodating the first side surface of the first light guide plate and the second side surface of the second light guide plate, and electrically connected to the first circuit layer and the second circuit layer.

2. The illumination apparatus of claim 1, wherein the first micro structure pattern comprises a plurality of first micro concaves or a plurality of first micro bumps, and the second micro structure pattern comprise a plurality of second micro concaves or a plurality of second micro bumps.

3. The illumination apparatus of claim 1, wherein the first light guide plate and the second light guide plate are disposed on the base in a side-by-side manner.

4. The illumination apparatus of claim 3, wherein when the first light guide plate and the second light guide plate are disposed on the base, the second light guide plate faces the first light guide plate with the second light-emitting surface.

5. The illumination apparatus of claim 3, further comprising an optical clear adhesive (OCA) disposed between the first light guide plate and the second light guide plate.

6. The illumination apparatus of claim 1, wherein the base further comprises a plurality of electrodes located in the cavity and electrically connected to the first circuit layer and the second circuit layer.

7. The illumination apparatus of claim 1, wherein each of the electrodes protrudes from a bottom surface of the cavity.

8. The illumination apparatus of claim 7, wherein the electrodes are configured to be engaged with at least one of the first side surface and the second side surface and electrically connected to both of the first color light source and the second color light source via the first circuit layer and the second circuit layer.

9. The illumination apparatus of claim 7, wherein the electrodes comprise a first electrode and a second electrode, and a cross-sectional shape of the first electrode is different from a cross-sectional shape of the second electrode.

10. The illumination apparatus of in claim 9, wherein at least one of the first side surface and the second side surface comprises a first recess configured to be engaged with the first electrode, at least one of the first side surface and the second side surface comprises a second recess configured to be engaged with the second electrode.

11. The illumination apparatus of claim 10, wherein the first circuit layer and the second circuit layer are extended to the first recesses to be electrically connected to the first electrode, and extended to the second recess to be electrically connected to the second electrode.

12. The illumination apparatus of claim 1, wherein the first light guide plate further comprises at least one first recessed compartment disposed on the first side surface for receiving the at least One first color light source, the second light guide plate further comprises at least one second recessed compartment disposed on the second side surface for receiving the at least one second color light source.

13. The illumination apparatus of claim 1, further comprising an opaque film covers a part of the first light-emitting surface or a part of the second light-emitting surface.

14. The illumination apparatus of claim 1, wherein the first region corresponds to the first micro structure pattern, and the second region corresponds to the second micro structure pattern.

15. The illumination apparatus of claim 1, further comprising a third light guide plate having a third light-emitting surface, a third side surface connected to the third light-emitting surface, a third micro structure pattern and a third circuit layer integrated with the third side surface, and at least one third color light source disposed on the third side surface and electrically connected to the third circuit layer, wherein light emitted by the third color light source enters the third light guide plate and being induced by the third micro structure pattern to orthogonally emit from a third region of the third light-emitting surface, and a projection area where the third region orthogonally projected onto the first light-emitting surface is neither overlapped with the first region nor overlapped with the second region.

* * * * *